Patented Apr. 29, 1941

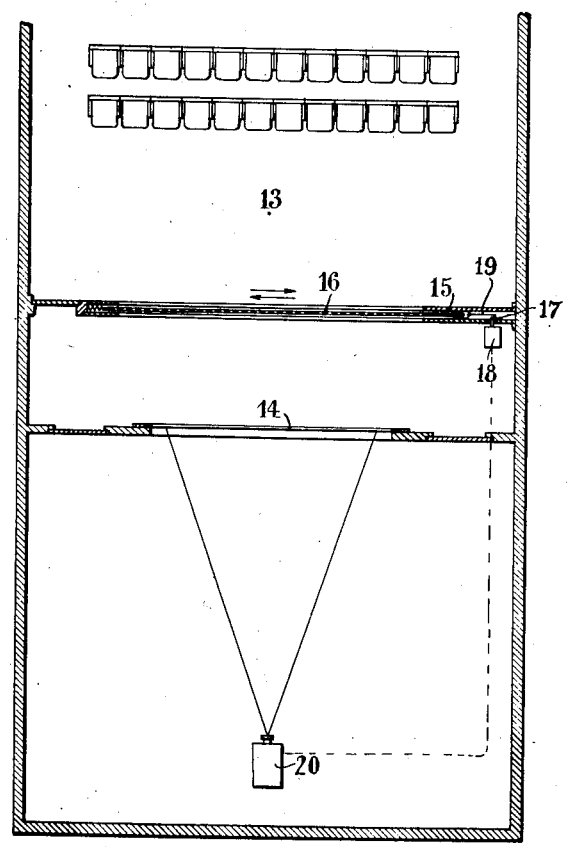

2,240,131

UNITED STATES PATENT OFFICE 2,240,131

ARRANGEMENT FOR SECURING STEREO-SCOPIC CINEMATOGRAPHIC PROJECTIONS

Suzanne Carré, née Berment, Paris, France, assignor to Société à Responsabilité limitée dite: La Chronostereoscopie, Paris, France Application March 18, 1938, Serial No. 196,783
In France March 23, 1937

1 Claim. (Cl. 88—16.6)

The present invention relates to the production of the effect of relief or stereoscopic effect by means of pictures projected on a screen.

Up to now various methods have been proposed, according to which the left hand pictures and the right hand pictures were projected on the screen by such means, and seen through such devices, that the left eye of each spectator could only see left pictures and his right eye could only see right pictures.

According to the present invention, relief or stereoscopic effect is obtained by alternately projecting on a plain screen, left hand pictures and right hand pictures each of them being directly and entirely projected on the screen, and by interposing a movable grid only between the screen and the spectators, the spaces of said grid having substantially the same width as its solid portions and being displaced during the projection of each picture so that each space of the grid occupies, during said projection, the same positions which were occupied by a solid portion adjacent to said space during the projection of the preceding picture.

It results therefrom that each picture, alternately left and right hand pictures, is entirely uncovered to both of the spectator's eyes. However, the stereoscopic effect is obtained clearly, owing to the above mentioned movement of the grid in front of the whole alternate pictures and this, without the use of individual sighting-devices.

The taking of view will be effected from suitable and different points and one or more films will be impressed simultaneously or alternately.

In the case in which the film or films are simultaneously impressed by the views taken from the different points, the alternation provided on the screen will be effected upon projection by suitable means, without it being necessary to more fully describe same in the present patent.

In the case in which, the views taken from different points would alternately impress the film or films, a view taking chamber could be used having a plurality of lenses which will be alternately obturated and thus allowing to alternately record the views.

The annexed drawing shows diagrammatically a projection hall, containing an embodiment of the equipment according to the invention.

By way of example, the drawing shows a projection hall 13 and a screen 14 in front of which is placed a grid 15 the bars 16 of which can be displaced according to a reciprocating lateral movement by a suitable device, such as a crank shaft 17 actuated by an electric motor 18 and connected to the grid by a connecting rod 19, said motor being connected also through any suitable transmission to the film feeding device and the shutters in the projection apparatus. Preferably, the projection will be effected by transparency, the apparatus 20 projecting the film in the case which has just been described, being placed behind the screen 14.

By suitably adjusting the position of the grid relatively to the screen, as well as the width of the bars and the spaces determining the eclipses, and finally the amplitude of the movement as well as the speed of displacement of the device relatively to the speed of the alternation of the pictures projected on the screen, a perfect impression of relief is obtained.

It has particularly been found that especially remarkable results were obtained by operating in the following manner:

Use is made of a grid the width of the bars of which is equal to the width of the spaces separating said bars and said grid has such a movement that the solid parts and the spaces will move to the extent of their width during the projection of a single picture, that is to say that the positions successively occupied by a solid portion during the projection of a picture will be successively occupied by the adjacent hollow portion during the projection of the following picture; the movement of the grid is such that during the time necessary for the projection of a picture, the right eye sees successively the whole of the picture projected, right or left-hand picture, and the left eye sees also successively all the same picture projected.

It suffices for that purpose to synchronize, by any known means, the motor 18 with that of the projection apparatus 20 so that the grid effects a single stroke to the left or to the right during the period of time which elapses between the disappearance of one picture and the disappearance of the following picture.

The grid can be replaced by a suitable device periodically eclipsing the elements of pictures projected on the screen, and the control of this device can be effected in any manner without further description being necessary in the scope of the present invention.

I claim:

In a projection apparatus for obtaining projection pictures in relief by projecting right and left elementary stereoscopic pictures, the combination of a projection screen, a projection apparatus so arranged as to alternately project a right and a left picture directly and wholly on said screen, a grid located between said screen and the spectators, outside the field comprised between the projection apparatus and the screen, said grid having spaces and solid portions of equal width, and means for moving said grid so that, during the projection of each elementary picture, each solid portion of said grid successively occupies the portions which were occupied by a space adjacent to said solid portion during the projection of the preceding picture.

SUZANNE CARRÉ, née BERMENT.